(12) United States Patent
Nakahara

(10) Patent No.: US 10,908,853 B2
(45) Date of Patent: Feb. 2, 2021

(54) IMAGE PROCESSING APPARATUS AND METHOD FOR CONTROLLING NOTIFICATIONS BETWEEN POWER TRANSITIONING

(71) Applicant: CANON KABUSHIKI KAISHA, Tokyo (JP)

(72) Inventor: Hidetaka Nakahara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/549,964

(22) Filed: Aug. 23, 2019

(65) Prior Publication Data

US 2020/0073601 A1 Mar. 5, 2020

(30) Foreign Application Priority Data

Aug. 31, 2018 (JP) .................................. 2018-162687

(51) Int. Cl.
*G06F 3/12* (2006.01)
(52) U.S. Cl.
CPC .......... *G06F 3/1221* (2013.01); *G06F 3/1229* (2013.01); *G06F 3/1288* (2013.01)
(58) Field of Classification Search
None
See application file for complete search history.

(56) References Cited

U.S. PATENT DOCUMENTS

| 2013/0318383 | A1* | 11/2013 | Takizawa | G06F 1/3234 |
| | | | | 713/323 |
| 2016/0156798 | A1* | 6/2016 | Wang | H04N 1/00896 |
| | | | | 358/1.14 |
| 2018/0234570 | A1* | 8/2018 | Yamaguchi | H04N 1/00896 |

FOREIGN PATENT DOCUMENTS

| JP | 2012-10185 A | 1/2012 |
| JP | 2015-106217 A | 6/2015 |

* cited by examiner

*Primary Examiner* — Henok Shiferaw
(74) *Attorney, Agent, or Firm* — Canon U.S.A., Inc., IP Division

(57) ABSTRACT

An image processing apparatus is provided. In a case where a transition from a certain power state to a first power saving state is made, the image processing apparatus stores first time information indicating a time of the transition to the first power saving state in a memory. In a case where a return from the first power saving state is made, the image processing apparatus notifies a management server of an event, which includes the first time information read out from the memory and indicates that the transition to the first power saving state has been made.

16 Claims, 9 Drawing Sheets

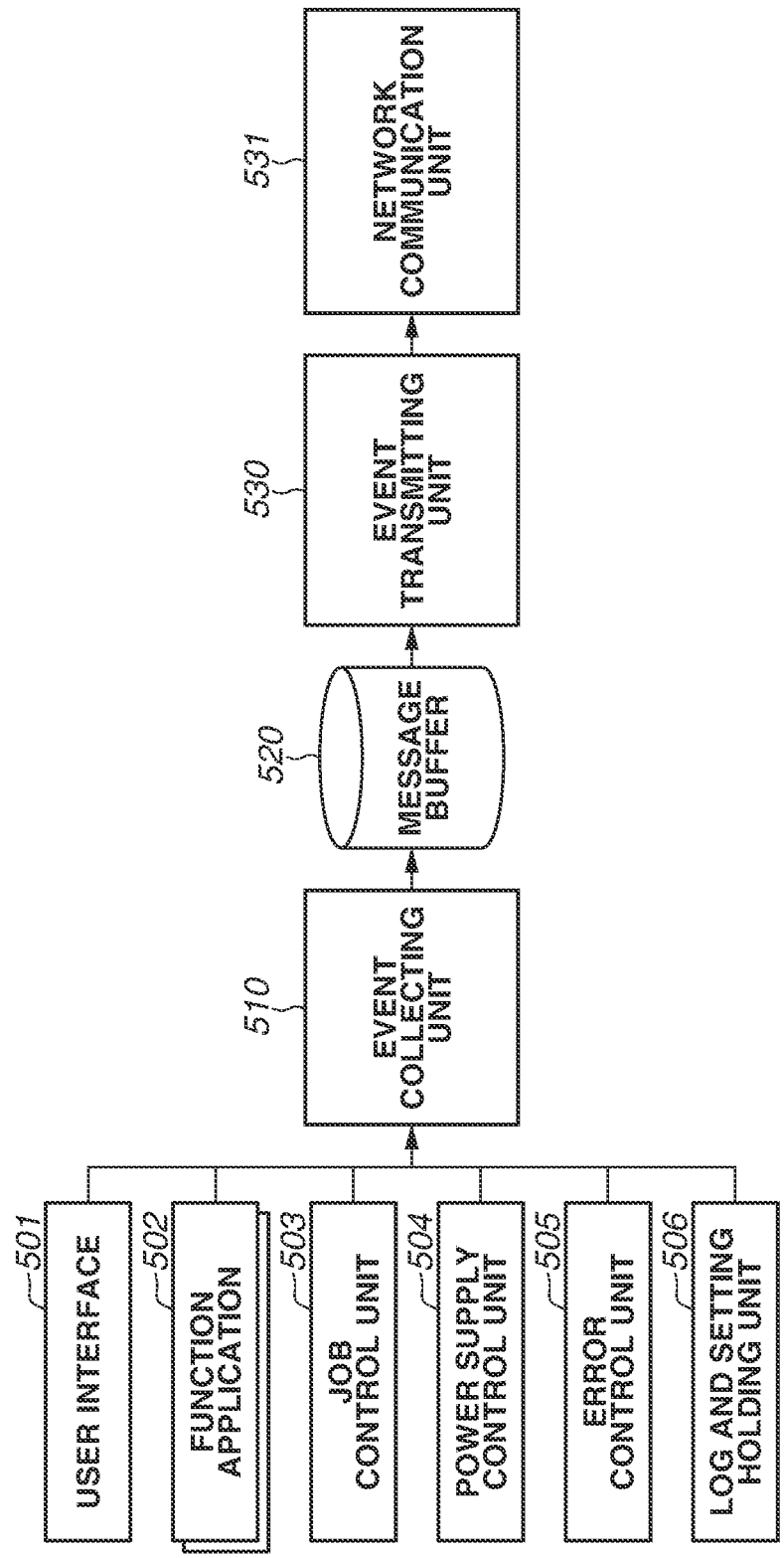

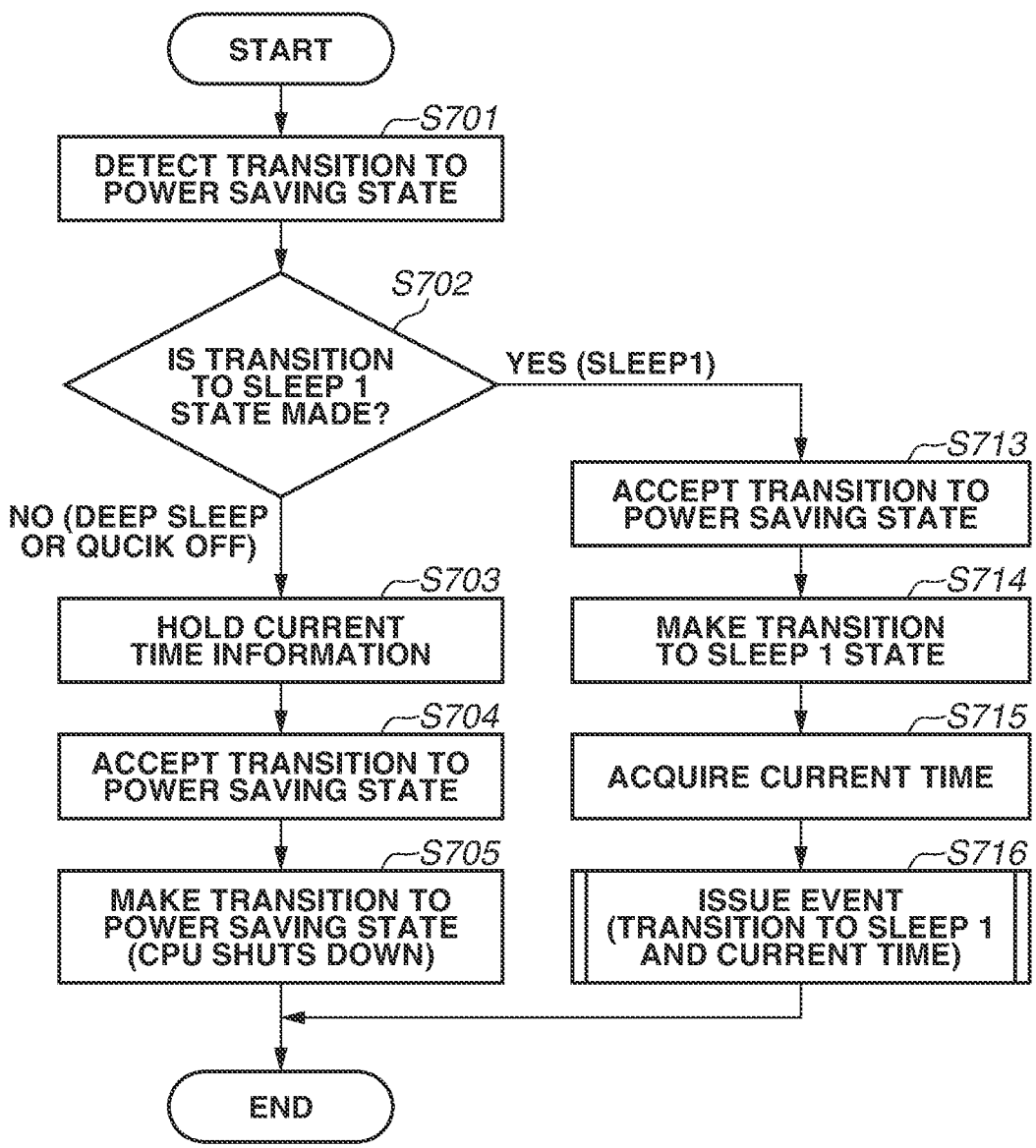

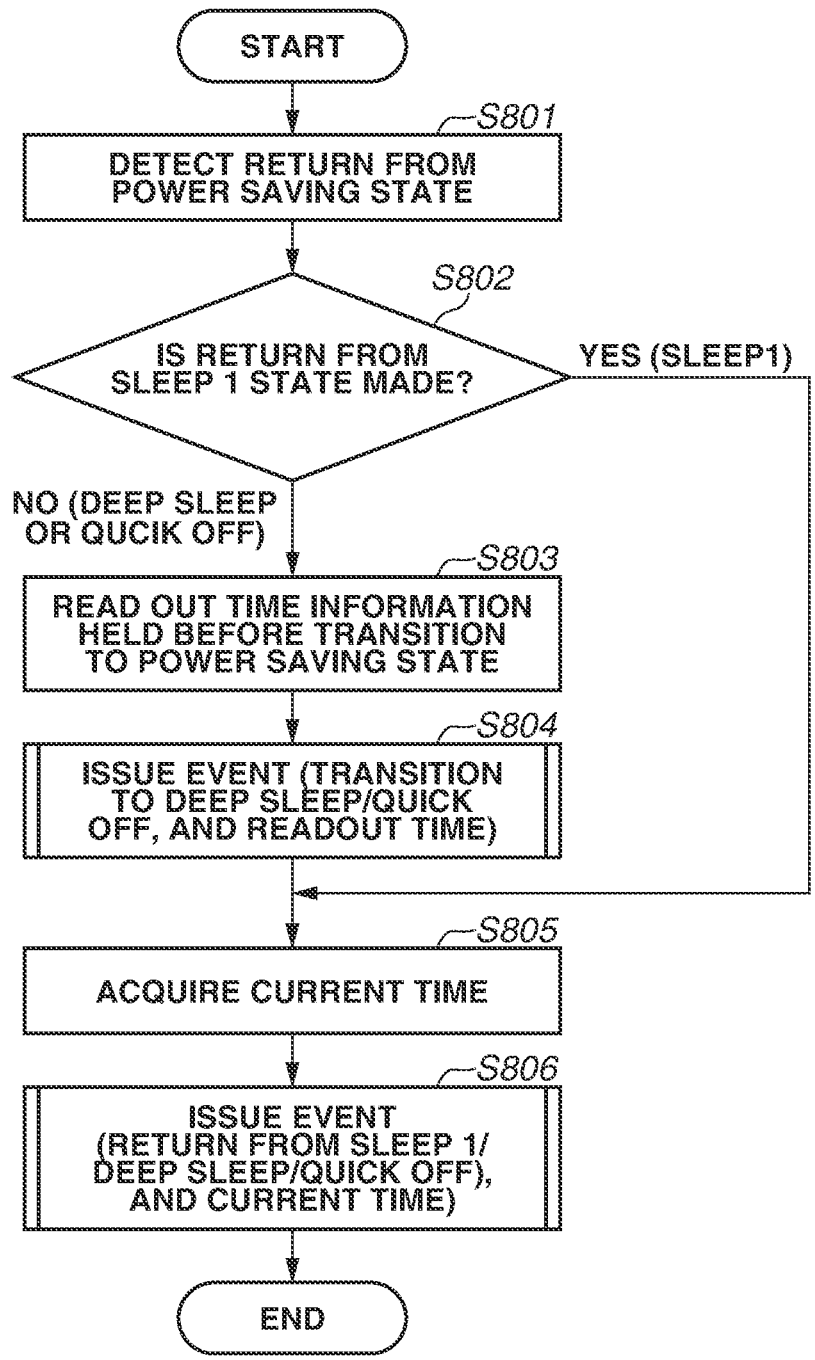

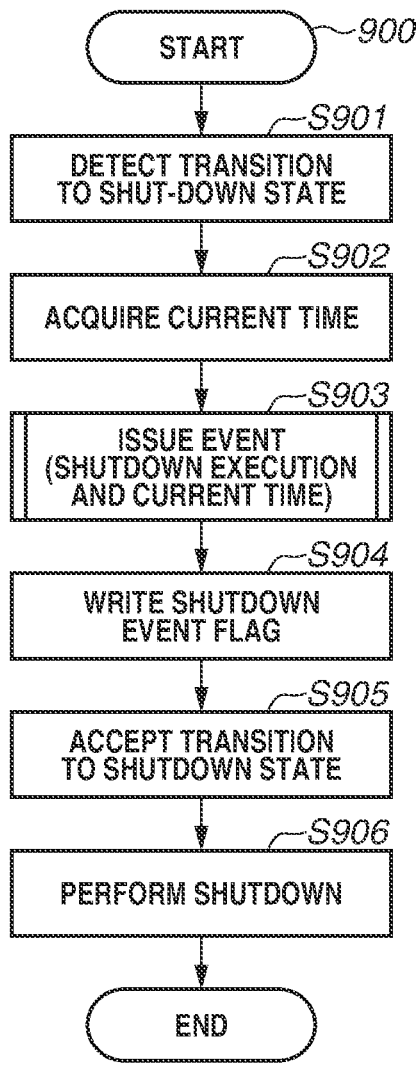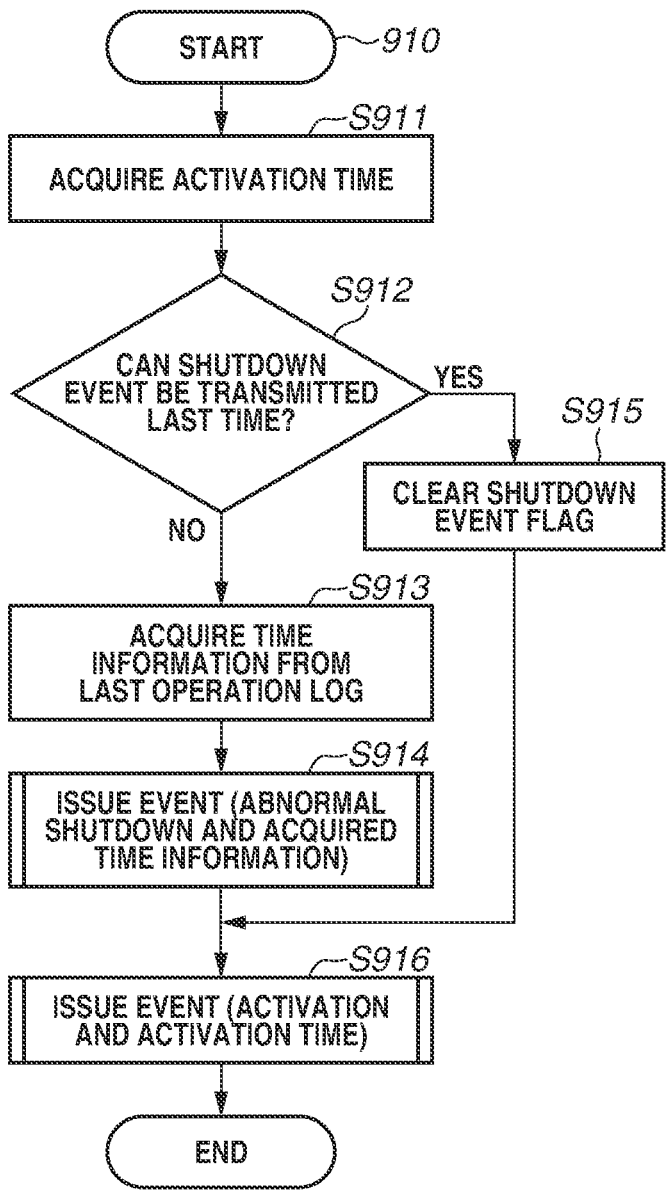

IMAGE PROCESSING APPARATUS AND METHOD FOR CONTROLLING NOTIFICATIONS BETWEEN POWER TRANSITIONING

BACKGROUND

Field

The present disclosure relates to a technique in an image processing apparatus where a transition of a power supply state to, for example, a power saving state is made.

Description of the Related Art

While an apparatus state is being monitored, for example, quick maintenance, prediction, and improvement of functions provided to the apparatus need to be performed. Thus, there is a known system that transmits a lot of various event logs from an apparatus in operation to an event log management server through the internet and analyzes, on a server side, the event logs to provide feedback on the analyzed event logs. In particular, to monitor an operation of the system, secure acquisition of information about a change in a power supply state of an image processing apparatus including a transition to and a return from a power saving state is required.

In an image forming apparatus discussed in Japanese Patent Application Laid-Open No. 2012-10185, transition information of a power supply state is collected, and an operating state can be acquired and analyzed precisely.

In a printing system discussed in Japanese Patent Application Laid-Open No. 2015-106217, a transition of a power supply state of the system can be collected in an environment where a printing control device is connected to an image forming apparatus.

In any of the prior literature, such an apparatus or a system is configured to notify a server of occurrence of a state transition before a transition to a power supply state or the state transition is saved as a log in a storage and is transmitted at another time allowing detailed information necessary for analyzing an operating condition to be saved in a management server.

However, in the image processing apparatus, after the transition to the power saving state is instructed, a quick state transition greatly contributes to power saving. After the transition to the power saving state is instructed, there is a need to make the quick transition to the power saving state with communication and processing for storing in a storage being avoided.

In order to analyze information, it is necessary to securely notify the management server of logs of the transition to the power saving state without preventing the transition of the image processing apparatus to the power saving state, and to quickly make this transition.

SUMMARY OF THE INVENTION

An image processing apparatus includes a processor executing a set of instructions causing the image processing apparatus to store, in a case where a transition from a certain power state to a first power saving state is made, first time information, which indicates a time of the transition to the first power saving state, in a memory, to read out, in a case where a return from the first power saving state is made, the first time information from the memory, and to notify a management server of an event, which includes the read-out first time information and indicates that the transition to the first power saving state has been made.

Further features will become apparent from the following description of exemplary embodiments with reference to the attached drawings.

BRIEF DESCRIPTION OF THE DRAWINGS

FIG. 5 is a diagram illustrating an example of a software configuration of the client device.

FIG. 7 is a flowchart illustrating an example of information processing for making a transition to a power saving state.

FIG. 8 is a flowchart illustrating an example of information processing for making a return from the power saving state.

FIGS. 9A and 9B are flowcharts illustrating examples of information processing for shutdown and activation.

DESCRIPTION OF THE EMBODIMENTS

Exemplary embodiments of the present disclosure will be described below with reference to the drawings.

Figure 1:
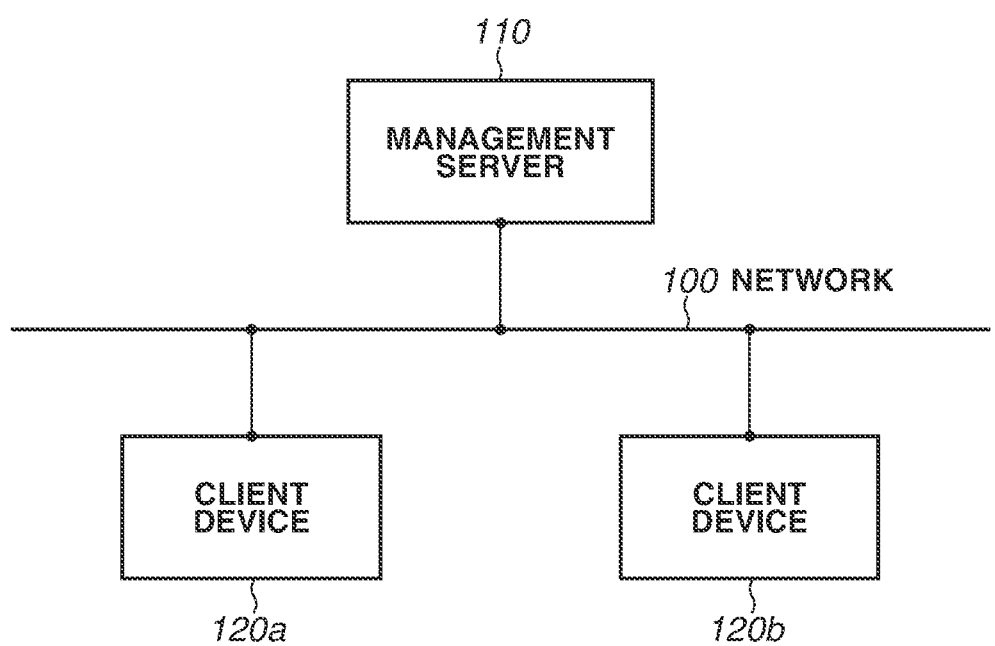
FIG. 1 is a diagram illustrating an example of a system configuration of an information processing system.

FIG. 1 is a diagram illustrating an example of a system configuration of an information processing system. A network 100 is connected with a management server 110 and a client device 120 (herein, for example, two devices 120a and 120b). The client device 120 is an example of an image processing apparatus.

The client device 120 has a communication function for notifying the management server 110 of an event in the client device 120 as a log event. The management server 110 has a function for saving the events notified by a plurality of client devices 120 in a storage in the management server 110. Information accumulated in the storage is used for, for example, analyzing an operation status of the client device 120.

In the present exemplary embodiment, the management server 110 is realized by a computer having a data storage function, an information processing calculation function, and a network communication function or cloud services having the equivalent functions.

The client device 120 may be a multifunction device which performs various types of functions such as a copying function and a facsimile (FAX) function. The client device 120 has a function for notifying the management server 110 of logs indicating execution of these functions, logs indicating a transition to and a return from the power saving state, logs indicating a transition to and a return from an abnormal state such as when an error occurs.

Figure 2:
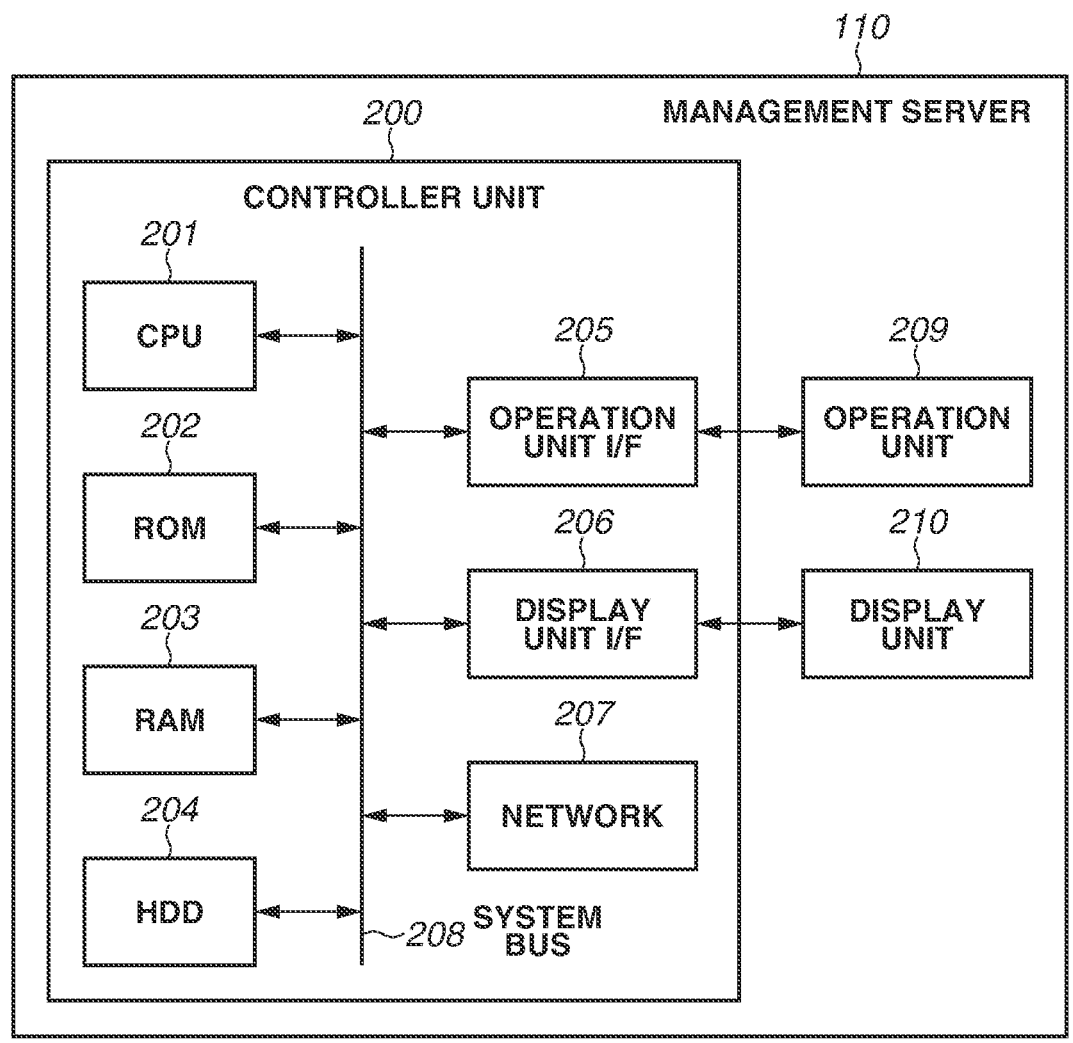
FIG. 2 is a diagram illustrating an example of a hardware configuration of a management server.

FIG. 2 is a diagram illustrating an example of a hardware configuration of the management server 110, which is realized by, for example, a general computer. The management server 110 includes a controller unit 200, an operation unit 209, and a display unit 210 as a hardware configuration. The controller unit 200 has a central processing unit (CPU) 201.

The CPU 201 activates an operating system (OS) using a boot program stored in a read only memory (ROM) 202.

The CPU 201 executes application programs stored in a hard disc drive (HDD) 204 on the OS to execute various processing. A random access memory (RAM) 203 is used as a work area of the CPU 201.

The HDD 204 stores data such as application programs, settings, and logs. The CPU 201 is connected to an operation unit interface (I/F) 205, a display unit I/F 206, and a network 207 as well as the ROM 202 and the RAM 203 via a system bus 208. The operation unit I/F 205 is an interface with respect to the operation unit 209 including a mouse and a keyboard, and transmits information input by a user using the operation unit 209 to the CPU 201. The display unit I/F 206 outputs image data to be displayed on the display unit 210 including a display to the display unit 210. The network 207 is connected to the network 100, and receives and outputs information from and to respective devices on the network 100 via the network 100.

Figure 3:
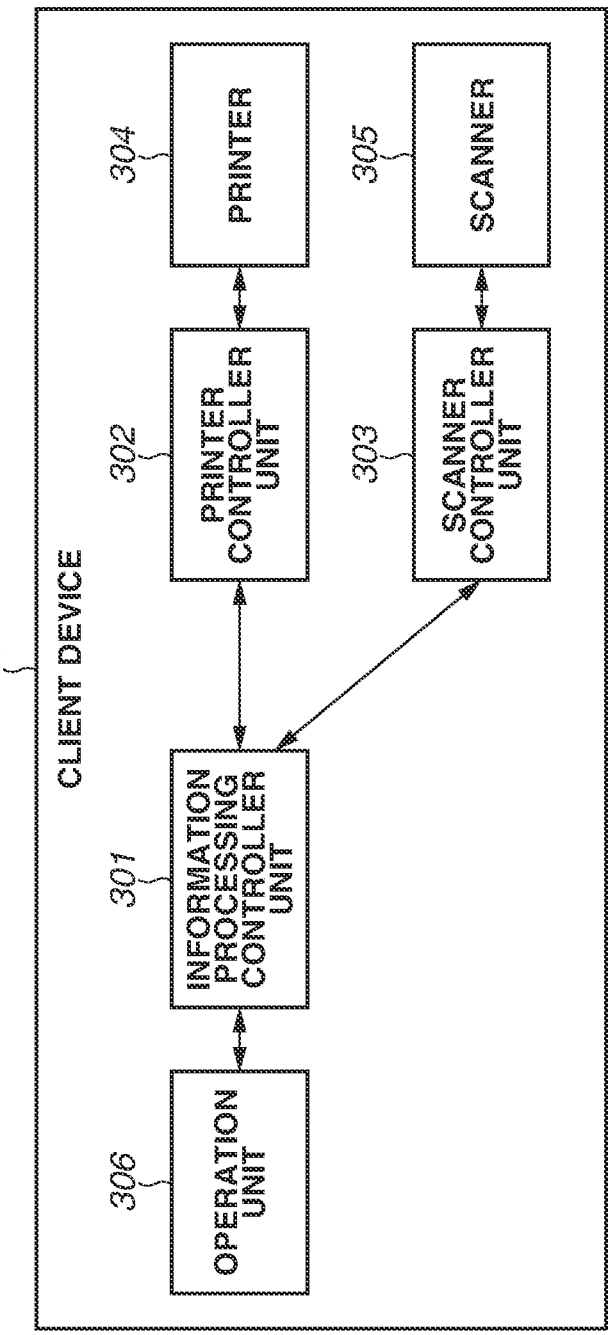
FIG. 3 is a diagram illustrating an example of a hardware configuration of a client device.

FIG. 3 is a diagram illustrating an example of a hardware configuration of the client device 120. The client device 120 is a multifunction device which includes an information processing controller unit 301, a printer controller unit 302, a scanner controller unit 303, a printer 304, a scanner 305, and an operation unit 306. The information processing controller unit 301 is a controller which controls an information processing operation of the client device 120. The information processing controller unit 301 is connected to the operation unit 306. The information processing controller unit 301 is further connected to the printer controller unit 302 which controls the printer 304 serving as an image output device, and the scanner controller unit 303 which controls the scanner 305 serving as an image input device.

Figure 4:
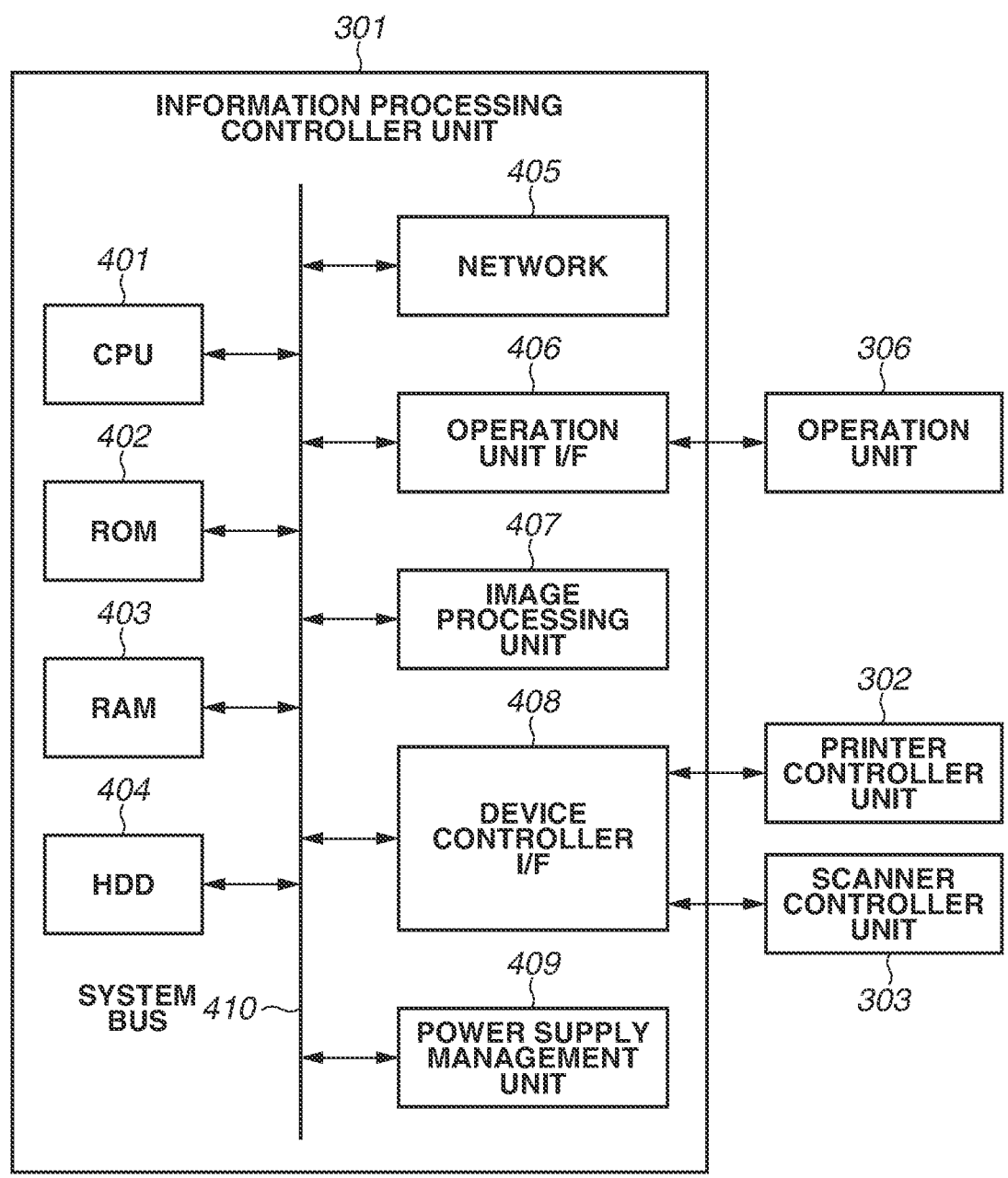
FIG. 4 is a diagram illustrating an example of a hardware configuration of an information processing controller unit.

FIG. 4 is a diagram illustrating an example of a hardware configuration of the information processing controller unit 301 of the client device 120. The information processing controller unit 301 has a CPU 401. The CPU 401 activates the OS using a boot program stored in a ROM 402. The CPU 401 executes application programs stored in an HDD 404 on this OS to execute various processing. A RAM 403 is used as a work area of the CPU 401. The RAM 403 provides an image memory area where image data is temporarily stored as well as the work area. The HDD 404 stores application programs, image data, various setting values, and logs. The CPU 401 is an example of a processor.

The CPU 401 is connected to a network 405, an operation unit I/F 406, an image processing unit 407, a device controller I/F 408, and a power supply management unit 409 as well as the ROM 402 and the RAM 403 via a system bus 410. The operation unit I/F 406 is an interface with respect to the operation unit 306 having a touch panel, and outputs image data to be displayed on the operation unit 306 to the operation unit 306. The operation unit I/F 406 further transmits information input by a user using the operation unit 306 to the CPU 401. The device controller I/F 408 is connected to the printer controller unit 302 and the scanner controller unit 303. The device controller I/F 408 converts a synchronous system/an asynchronous system of image data. The network 405 is connected to the network 100, and receives and outputs information from and to the respective devices on the network 100 via the network 100. The image processing unit 407 executes, for example, processing for outputting an image to the printer 304, processing for receiving an image from the scanner 305, image rotation processing, image compression processing, resolution conversion processing, color space conversion processing, and tone conversion processing. The power supply management unit 409 controls the power supply of the entire apparatus, namely, turning-on/off of the power supply, and controls a transition to a power saving state other than a normal energized state and a return to the normal energized state.

The CPU 401 executes processing based on a program stored in any one of the ROM 402 and the HDD 404 or programs stored in both of them, and thus realizes a software configuration illustrated in FIG. 5 and processing in flowcharts illustrated in FIGS. 6A to 9B, described below.

FIG. 5 is a diagram illustrating an example of a software configuration of the client device 120.

A user interface 501 has a function for displaying a screen on which a user operates the operation unit 306, and transmitting an operation performed by the user.

A plurality of function applications 502, such as a copying application, a printing application, and a mail transmitting application, is provided to the device, and causes the application functions of the multifunction device to be executed upon an instruction from the user via the operation unit 306 or data reception via the network 405.

Upon reception of an instruction from the function application 502, a job control unit 503 controls the printer controller unit 302 and the scanner controller unit 303 to perform printing and scanning, respectively.

A power supply control unit 504 controls the power supply management unit 409 in conjunction with a software state in the apparatus so that the transition between the normal energized state and the power saving state is performed. The normal energized state is an example of a normal power state.

An error control unit 505 receives notification of abnormal states mainly in the job control unit 503, the printer controller unit 302, and the scanner controller unit 303, and shuts down the entire system or instructs a degeneracy of an unavailable unit (i.e. a fallback operation).

A log and setting holding unit 506 manages nonvolatile information in the device. The log and setting holding unit 506 holds settings necessary for controlling the multifunction device and jobs, and summarizes user operation logs, job executed results, and error occurrence to save them. Log information which is left for a debugging analysis in occurrence of an error in the system is also saved in the log and setting holding unit 506. Entity of nonvolatile data is held in the HDD 404.

An event collecting unit 510 monitors a state transition made in modules (501 to 506) in the device, normalizes the state transition in a form of an event, and saves the event in a message buffer 520 to transmit the event to the management server 110. The message buffer 520 saves the event, which is in the HDD 404 and is normalized, in a nonvolatile area. A general-purpose format, such as Java Script® Object Notation (JSON) is used for the normalization. In addition to basic information including an event name, an occurred time, and a serial number of a client device, various information is allocated according to types of events. The event collecting unit 510 acquires the allocated information by referring to the nonvolatile information in the log and setting holding unit 506 or acquires dynamically from states of the modules (501 to 506) in the device.

An event transmitting unit 530 detects writing into the message buffer 520, reads out information from the message buffer 520 upon issuance of an event, and transmits the event to the management server 110 via a network communication unit 531. The network communication unit 531 performs communication using the network 405.

Figure 6A:
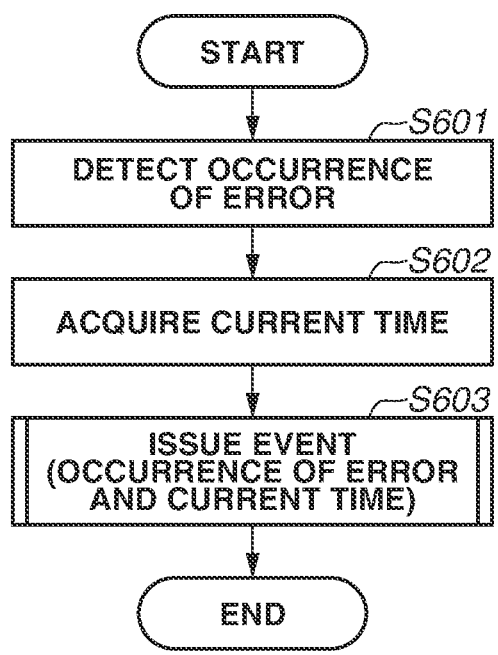
FIGS. 6A and 6B are flowcharts illustrating examples of information processing for transmitting an event to a management server.
Figure 6B:
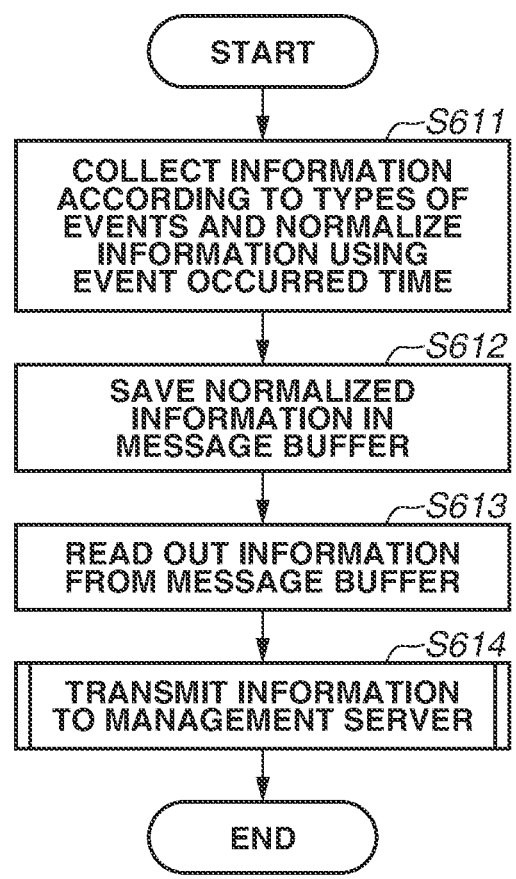

FIGS. 6A and 6B are flowcharts illustrating examples of information processing for transmitting an event to the management server 110 in a case where various events occur in the client device 120.

An error occurrence event will be described as an example with reference to FIG. 6A.

In step S601, the event collecting unit 510 detects occurrence of an error.

In step S602, the event collecting unit 510 acquires a current time.

In step S603, the event collecting unit 510 executes processing on an event issuing subroutine using an error event and the acquired current time as arguments to transmit the event to the management server 110.

This subroutine will be described in detail with reference to FIG. 6B.

In step S611, the event collecting unit 510 collects information which is associated in advance with received event contents from the modules in the device. For example, in a case of an error occurrence event, the event collecting unit 510 collects an error code, a name of a part with an error, a counted value of sheets which have passed until the occurrence of the error, and so forth. For example, in a case of a copying job completion event, the event collecting unit 510 collects a name of a user who executes the job, discrimination between color copying and monochrome copying, a number of documents to be scanned, a number of sheets to be printed, and so forth. The event collecting unit 510 performs normalization into a general-purpose format such as JSON using the collected information and given time information.

In step S612, the event collecting unit 510 saves the normalized event information in the message buffer 520. At this time, the contents transmitted to the server are fixed.

In step S613, the event transmitting unit 530, which has detected this writing as asynchronous, reads out the event information from the message buffer 520.

In step S614, the event transmitting unit 530 performs an operation of transmission to the management server 110. The event transmitting unit 530 executes the processing including an authenticating operation for the server and retrying processing during a communication error until the transmission is completed. The management server 110 saves the received event information in the storage.

In such a manner, various events which occur in the client device 120 are transmitted to the management server 110 and are collected therein.

The energized state of the multifunction device will be described with reference to Table 1 (Table: Classification of Energized State) as shown below. The energized state of the multifunction device to be controlled by the power supply control unit 504 is broadly classified into four kinds of states in Table 1. Firstly, in a normal energized state, all functions of the multifunction device including, for example, the operation unit 306 and the network can be used.

Secondly, in a sleep 1 state, the multifunction device is mainly in a power saving state by turning off a panel of the operation unit 306. However, inside the multifunction device, the CPU 401 is energized, and operations of the internal software modules and the network communication can be used in the sleep 1 state as well as in the normal energized state. The multifunction device can be returned to the normal energized state by a user to operate the operation unit 306 and by reception of a job from the network. The sleep 1 state is an example of a second power saving state in which the processor is not shut down.

Thirdly, in a deep sleep state, an operation of the CPU 401 is halted, and the multifunction device makes a transition to a power saving state in which the power is lower than in the sleep 1 state. However, the multifunction device can be returned to the normal energized state by a user to operate the operation unit 306 and by reception of a job from the network in the deep sleep state as well as in the sleep 1 state. If the multifunction device makes the transition to the deep sleep state, the CPU 401 is once shut down, but a state of the memory including a register of the CPU 401 is maintained and thus, after the return, the multifunction device can resume the operation just before the shutdown. The deep sleep state is an example of a first power saving state, and causes the processor to be shut down. In the deep sleep state, only the memory and partial hardware are energized, and the CPU 401 is shut down. Herein, the memory is the RAM 403. The partial hardware is the network 405. The network 405 is an example of a communication device.

Finally, in a quick off state, the multifunction device makes a transition through a power-off operation in a state in which a high-speed activating mode is permitted from a viewpoint of a user. Therefore, the multifunction device does not return to the normal energized state by any operations other than a power-on operation. Although the power-off operation is performed, the state of the memory including the register of the CPU 401 is maintained inside the multifunction device in the quick off state as well as in the deep sleep state, and thus the multifunction device can return from the quick off state. Thus, from the viewpoint of a user, the power-on operation is performed at high speed. The quick off state is an example of a first power saving state, and causes the processor to be shut down. The quick off state causes only the memory to be energized, and the CPU 401 to be shut down. Herein, the memory is the RAM 403.

Three kinds of states other than the normal energized state are the power saving states. The multifunction device makes a transition in a case where a certain time elapses in a state that the multifunction device is left during timer monitoring or in a case where a user instructs the transition to the power saving state. In the transition, after states of other modules are checked by the power supply control unit 504, the transition operation waits for completion of the processing of the other modules, and is performed after acceptance of the transition from the modules.

TABLE 1

(Classification of Energized State)

| Type | CPU state | Return trigger | Operation after return |
|---|---|---|---|
| Normal energized | Operate | — | — |
| Sleep 1 | Operate | Job reception and user operation | — |
| Deep sleep | Shutdown | Job reception and user operation | Return in memory state and operation before shutdown |
| Quick off | Shutdown | Press explicit power button | Return in memory state and operation before shutdown |
| Power off | Shutdown | Press explicit power button | Reactivate from activation sequence |

An event issuing operation in the transition to the power saving state will be described with reference to a flowchart of FIG. 7.

In step S701, the event collecting unit 510 detects the transition to the power saving state. An operation changes depending on whether the CPU 401 is shut down due to the state transition.

Thus, in step S702, the event collecting unit 510 determines whether the event of the transition is the one to the sleep 1 state or the other (deep sleep or quick off) states. In a case where the event collecting unit 510 determines that the event is the event of the transition to the sleep 1 state (YES in step S702), the processing proceeds to step S713. In a case where the event collecting unit 510 determines that the event is not the event of the transition to the sleep 1 state (No in step S702), the processing proceeds to step S703.

In step S713, the event collecting unit 510 accepts the transition to the sleep 1 state for the power supply control unit 504.

When all the related modules accept the transition to the power saving state, in step S714, the power supply control unit 504 causes the transition to the sleep 1 state. However, the CPU 401 is not shut down, and thus the subsequent processing of software can be executed.

In step S715, the event collecting unit 510 acquires a current time. The current information acquired in step S715 is an example of third time information indicating a time when the transition to the sleep 1 state is made.

In step S716, the event collecting unit 510 calls a subroutine in FIG. 6B so that the event of the transition to the sleep 1 state is issued using the current time. The processing in step S716 is an example of third notification processing.

On the other hand, in step S703, the event collecting unit 510 performs only an operation for storing a current time as the time information in the RAM 203. The time information in step S703 is an example of first time information indicating a time when the transition to the deep sleep state or the quick off state is made.

In step S704, the event collecting unit 510 accepts the transition to the power saving state for the power supply control unit 504.

When all the related modules accept the transition to the power saving state, in step S705, the power supply control unit 504 actually causes the transition to the power saving state. Thus, the CPU 401 is once shut down, and the software cannot perform the operation.

In this case, the management server 110 is not notified that the transition to the power saving state has been made, but quick transition to the power saving state is not prevented. The unnotified event of the transition to the power saving state will be described below with reference to FIG. 8.

The return from the power saving state will be described with reference to a flowchart of FIG. 8.

In the client device 120 in the power saving state, in step S801, the event collecting unit 510 detects the return from the power saving state.

In step S802, the event collecting unit 510 determines whether a return from the sleep 1 state is made. In a case where the return from the sleep 1 state is made (YES in step S802), the event collecting unit 510 has already transmitted the event during the transition, and thus the processing proceeds to step S805. In a case where the return from a state that the CPU 401 is shut down (NO in step S802), the processing proceeds to step S803.

In S805, the event collecting unit 510 acquires the current time stored in step S703 from the HDD 404. The time information acquired in step S805 is an example of second time information indicating a time when the return from the deep sleep state or the quick off state is made.

In step S806, the event collecting unit 510 calls the subroutine in FIG. 6B, and notifies the management server 110 of the event of the return from the sleep 1 state.

On the other hand, in step S803, the event collecting unit 510 reads out the time information stored in the RAM 203 in step S703 of FIG. 7 before the transition to the power saving state.

In step S804, the event collecting unit 510 calls the subroutine in FIG. 6B using the read-out time information, and notifies the management server 110 of the event of the transition to the power saving state. The time information transmitted at this time is not a current time but time information acquired before the transition to the power saving state. The processing in step S804 is an example of first notification processing.

In step S805, the event collecting unit 510 acquires a current time.

In step S806, the event collecting unit 510 calls the subroutine in FIG. 6B, and notifies the management server 110 of the event of the return from the sleep 1 state. The processing in step S806 is an example of second notification processing.

In the transition to the power saving state in which the CPU 401 is shut down and the return from the power saving state, the above series of the operations enable transmission of the event of the state transition using correct time information without disturbing the transition to the power saving state due to information transmission to the server.

As described above about the series of flows in FIGS. 7 and 8, an accurate event can be transmitted without disturbing the transition to the power saving state as much as possible. At timing of the return from the power saving state, accurate time information is collectively held in the event of the transition to the power saving state and the event of the return from the power saving state, and these events can be transmitted in chronological order.

The transmission of the events with correct time information in chronological order enables supply of correct information to a service for monitoring the operation of the client device 120.

The above description refers to the processing for, in the transition to the power saving state, holding only the time information in the memory and transmitting events using past times after return. However, during the transition to the power saving state, power sharing might be once shut down due to power-off intended by a user or a power outage. In this case, the time information held only in the memory cannot be used and a stacked on-executing program cannot be re-executed. Thus, if the power is turned on in a state that the transition to the power saving state and the turning-off the power in the processing in the flowchart of FIG. 8 cannot be notified, the normal activation processing starts.

Transmission of a relief event for notifying of occurrence of power shutdown in order to enable a check of an operating state of the client device 120 even in occurrence of an abnormal power-off state will be described with reference to flowcharts in FIGS. 9A and 9B.

In a case where the client device 120 is properly shut down, processing 900 in FIG. 9A is executed.

In step S901, the event collecting unit 510 detects a transition to the shutdown state. In step S902, the event collecting unit 510 acquires a current time.

In step S903, the event collecting unit 510 transmits the event of the transition to the shutdown state to the management server 110 using the subroutine in FIG. 6B.

Upon completion of this processing, in step S904, the event collecting unit 510 writes a shutdown event flag, which indicates that the shutdown event has been transmitted, in the HDD 404.

After completion of this processing, in step S905, the event collecting unit 510 accepts the transition to the shutdown state for the power supply control unit 504.

When all the related modules accept the transition to the shutdown state, in step S906, the power supply control unit 504 actually performs the shutdown.

On the other hand, processing 910 in FIG. 9B is executed at the activation.

When the client device 120 is activated, in step S911, the event collecting unit 510 acquires a time when the client device 120 is activated.

In step S912, the event collecting unit 510 determines whether the shutdown event can be properly transmitted last time. The event collecting unit 510 determines whether the shutdown event can be properly transmitted last time based on whether the shutdown event flag written in step S904 in FIG. 9A is present. In a case where the event collecting unit 510 can properly transmit the shutdown event (YES in step S912), the processing proceeds to step S915. In a case where the event collecting unit 510 cannot properly transmit the shutdown event (NO in step S912), the processing proceeds to step S913.

In step S915, the event collecting unit 510 clears the shutdown event flag.

In step S916, the event collecting unit 510 issues an activation event to the management server 110 using the subroutine in FIG. 6B.

On the other hand, in step S913, the event collecting unit 510 searches the nonvolatile information held in the log and setting holding unit 506 for remaining the latest time information which is before this activation. Although various logs such as job logs and operation logs remain, the time information indicating that a debagging analysis log changes most recently is most likely held, and thus this log is searched most beneficially. In the power-off in the normal energized state or the sleep 1 state, the time information just before the power-off can be acquired. In the power-off in the deep sleep state or the quick off state, the time information close to a time just before the transition to the power saving state can be acquired.

After the time information remaining in the most recent operation log is acquired, in step S914, the event collecting unit 510 issues an abnormal shutdown event. The event collecting unit 510 can extract information from the operation log, in which time information is acquired, to provide the extracted information as allocated information associated with this event.

In step S916, the event collecting unit 510 issues an activation event to the management server 110 using the subroutine in FIG. 6B.

Even in a case where the power-off is performed during the transition to the power saving state, the processing of the flowchart enables transmission of information, which is estimated from the most recent log in which the CPU 401 is shut down, to the management server 110.

According to the processing according to the above described exemplary embodiment, the management server can be notified of a log in which the transition to the power saving state has been made, while the transition to the power saving state is quickly made. Thus, in an analysis of the operation state, detailed and accurate information can be used.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-162687, filed Aug. 31, 2018, which is hereby incorporated by reference herein in its entirety.

What is claimed is:

1. An image processing apparatus comprising:
a processor executing a set of instructions causing the image processing apparatus to:
store, in a case where a transition from a certain power state to a first power saving state is made, first time information which indicates a time of the transition to the first power saving state, in a memory;
read out, in a case where a return from the first power saving state is made, the first time information from the memory; and
notify a management server of an event, which includes the read-out first time information and indicates that the transition to the first power saving state was made.

2. The image processing apparatus according to claim 1, wherein the first power saving state is a power saving state in which the processor is shut down.

3. The image processing apparatus according to claim 1, wherein the first power saving state is a power saving state in which only the memory is energized and the processor is shut down, or a power saving state in which only the memory and partial hardware are energized and the processor is shut down, and
wherein the partial hardware is different from the memory and the processor.

4. The image processing apparatus according to claim 3, wherein the partial hardware is a communication device.

5. The image processing apparatus according to claim 1, wherein the instructions further cause the image processing apparatus to notify, in a case where the return from the first power saving state is made, the management server of an event, which includes second time information indicating a time of the return from the first power saving state and indicates that the return from the first power saving state has been made.

6. The image processing apparatus according to claim 1, wherein the instructions further cause the image processing apparatus to notify, in a case where a transition from a certain power state to a second power saving state is made, the management server of an event, which includes third time information indicating a time of the transition to the second power saving state and indicates that the transition to the second power saving state was made.

7. The image processing apparatus according to claim 6, wherein the second power saving state is a power saving state in which the processor is not shut down.

8. The image processing apparatus according to claim 1, wherein the memory is a random access memory (RAM).

9. A method for an image processing apparatus including a processor, comprising:

storing, in a case where a transition from a certain power state to a first power state is made, first time information which indicates a time of the transition to the first power saving state, in a memory;

reading out, in a case where a return from the first power saving state is made, the first time information from the memory; and notifying a management server of an event, which includes the read-out first time information and indicates that the transition to the first power saving state was made.

10. The method according to claim 9, wherein the first power saving state is a power saving state in which the processor is shut down.

11. The method according to claim 9, wherein the first power saving state is a power saving state in which only the memory is energized and the processor is shut down, or a power saving state in which only the memory and partial hardware are energized and the processor is shut down, and wherein the partial hardware is different from the memory and the processor.

12. The method according to claim 11, wherein the partial hardware is a communication device.

13. The method according to claim 9, further comprising:

notifying, in a case where the return from the first power saving state is made, the management server of an event, which includes second time information indicating a time of the return from the first power saving state and indicates that the return from the first power saving state has been made.

14. The method according to claim 9, further comprising:

notifying, in a case where a transition from a certain power state to a second power saving state is made, the management server of an event, which includes third time information indicating a time of the transition to the second power saving state and indicates that the transition to the second power saving state was made.

15. The method according to claim 14, wherein the second power saving state is a power saving state in which the processor is not shut down.

16. The method according to claim 9, wherein the memory is a random access memory (RAM).

* * * * *